United States Patent [19]

Schmidt et al.

[11] Patent Number: 5,358,333

[45] Date of Patent: * Oct. 25, 1994

[54] METHOD OF AND MEASURING ARRANGEMENT FOR CONTACTLESS ON-LINE MEASUREMENT

[75] Inventors: Hugo Schmidt, Giessen-Luetzellinden; Manfred Ruckszio, Taunusstein; Raimund Haas, Frankfurt am Main, all of Fed. Rep. of Germany

[73] Assignee: Hoechst Aktiengesellschaft, Frankfurt am Main, Fed. Rep. of Germany

[*] Notice: The portion of the term of this patent subsequent to Jan. 24, 2011 has been disclaimed.

[21] Appl. No.: 72,877

[22] Filed: Jun. 4, 1993

Related U.S. Application Data

[63] Continuation of Ser. No. 876,429, Apr. 30, 1992, abandoned.

[30] Foreign Application Priority Data

May 6, 1991 [DE] Fed. Rep. of Germany ....... 4114672

[51] Int. Cl.$^5$ ............... G01N 25/00; G01N 21/17; G01N 25/72; G01B 11/06
[52] U.S. Cl. ............................ 374/7; 374/45; 374/5; 250/560; 250/562
[58] Field of Search ............ 374/4, 5, 6, 7, 161, 374/45; 250/560, 562

[56] References Cited

U.S. PATENT DOCUMENTS

| | | | |
|---|---|---|---|
| 3,206,603 | 9/1965 | Mauru | 374/5 |
| 3,433,052 | 3/1969 | Maley | 374/5 |
| 3,667,846 | 6/1972 | Nater et al. | 374/6 |
| 3,973,122 | 8/1976 | Goldberg | 374/7 |
| 3,978,713 | 9/1976 | Penney | 374/7 |
| 4,513,384 | 4/1985 | Rosencwaig | 374/7 |
| 4,521,118 | 6/1985 | Rosencwaig et al. | 374/5 |
| 4,522,510 | 6/1985 | Rosencwaig et al. | 374/7 |
| 4,543,486 | 9/1985 | Rose | 374/7 |
| 4,579,463 | 4/1986 | Rosencwaig et al. | 374/5 |
| 4,634,290 | 1/1987 | Rosencwaig et al. | 374/5 |
| 4,679,946 | 7/1987 | Rosencwaig et al. | 374/7 |
| 4,818,118 | 4/1989 | Bantel et al. | 374/7 |
| 5,118,945 | 6/1992 | Winschuh et al. | 374/7 |
| 5,166,080 | 11/1992 | Schietinger et al. | 374/7 |

FOREIGN PATENT DOCUMENTS

| | | | |
|---|---|---|---|
| 0857821 | 8/1981 | U.S.S.R. | 374/6 |
| 0868332 | 9/1981 | U.S.S.R. | 374/7 |
| 1395939 | 5/1988 | U.S.S.R. | 374/7 |
| 2167855 | 6/1986 | United Kingdom . | |
| 2220065 | 12/1989 | United Kingdom . | |

OTHER PUBLICATIONS

Patent Abstracts of Japan, vol. 12, No. 51 (P-667) 16 Feb. 1988 Abstract of JP-A-62 198 707, Koji–Noncontact Paint Inspecting Device (Only abstract considered).

C. Linhart and A. Weckenmann, "Contactless Evaluation of the Thickness of Surface Coatings with Thermal Effects," Technisches Messen TM. Bd. 49, Nr. 11, Nov. 1982, Munchen DE pp. 391–398.

Sick GmbH Optik–Elektronik, "SORM Sick Optical Roughness Measuring System". (no date).

"Profile Measuring Station RM 600 2-D" (1990).

*Primary Examiner*—Diego F. F. Gutierrez
*Attorney, Agent, or Firm*—Foley & Lardner

[57] ABSTRACT

With an infrared radiator, the surface temperature of which is kept constant during measurement, a measuring area on a material surface is thermally irradiated with oblique incidence of the rays. The temperature of the reflected thermal radiation is measured by an infrared thermometer, which is arranged above the measuring area in such a way that the reflected radiation falls into the area of coverage of the infrared thermometer. The entire measuring area of the material surface which lies in the field of coverage of the infrared thermometer must be thermally irradiated. The measured temperature variation of the reflected radiation in dependence on the surface condition of the material is stored in a comparison device. A set value for the desired surface condition is fed to this comparison device. The infrared temperature of a material surface, initially unknown with respect to its surface condition, is measured and compared with the stored temperature variation in order to determine the magnitude of the surface parameter. From the value thus obtained and the set value fed in, a differential signal is formed, which is fed via the output of the comparison device to a control of a treatment device for the material.

19 Claims, 3 Drawing Sheets

METHOD OF AND MEASURING ARRANGEMENT FOR CONTACTLESS ON-LINE MEASUREMENT

This application is a continuation of application Ser. No. 07/876,429, filed Apr. 30, 1992, now abandoned.

BACKGROUND OF THE INVENTION

The invention relates to a method of providing a contactless on-line measurement of the surface structure or thickness of a material or a layer on a material in plate or strip form as well as to a measuring arrangement.

Texture parameters are an essential quality feature of metal surfaces. The most well known is the representation of the surface roughness, the extensive data on a measured roughness profile section in practice usually being reduced to just a few characteristic variables, such as for example the peak-to-valley height Ra and the average peak-to-valley height Rz.

In roughness measurement, it is generally not necessary to scan and measure the entire surface uninterruptedly. It is enough if a sufficiently large number of measurements permit an adequate statistical finding. In the case of a fast-moving material, considerable difficulties are involved in detecting the roughness by means of an on-line measurement. The traditional stylus method is not in any way capable of producing satisfactory results at speeds greater than 20 m/min. Therefore, such on-line measurements have long been carried out on an optical basis.

For instance, a roughness measuring instrument which is used in the field of the metal-processing industry as an on-line measuring instrument for continuous process control is described in the company publication of Sick GmbH Optik-Elektronik, Munich "SORM Sick optisches Rauheitsmess system" (SORM Sick optical roughness measuring system). With the aid of a semiconductor laser, the measuring instrument generates a fine laser measuring beam on the material surface. The light spot diameter is about 10 μm. The surface structure causes the impinging light to be reflected in a certain spatial direction, depending on the flank angle of the surface facet. The principal direction of the reflection is detected by a laser diode receiver array and converted into an angle-dependent analog signal. This analog signal is digitized and the surface level profile calculated on the basis of the flank angle data and the advancement information. Consequently, a profile characteristic which is approximately comparable with a mechanical measurement is obtained as raw data. Subsequently, this raw data is evaluated in the usual way and the standardized roughness variables, such as Ra, Rz, are determined and output.

In the case of this measurement, the intensity distribution reflected from the surface falls, in the form of a scattering lobe via a number of lenses, onto the assigned photoreceiver array arranged annularly around the laser light spot. The photoreceivers forming this photoreceiver array are interconnected in the form of a PSD sensor (position sensitive detector). The direction of the point of concentration of the scattering lobe is measured directly at each measuring point. Consequently, the flank steepness of the respective surface facet is determined optically at each surface measuring point. Upon movement of the surface to be measured under the measuring head, the surface profile is calculated by back-integration. The roughness measuring area is, for Ra 0.05, up to 2.5 μm, and the material speed lies in the range of 0.3 to 30 m/sec.

This measuring instrument is very complex since the optical measuring head contains, in addition to a semiconductor laser, the receiver array, an autofocussing device for correcting the optical measuring head, and a signal preprocessing means. Furthermore, an evaluation computer with two floppy disk drives, an interface for a plurality of optical measuring heads and a central processing unit are required.

A surface measuring system RM 600, with which surface structures between 0.02 μm and 600 μm can be detected quickly and contactlessly is described in the company publication "Profilmess platz RM 600 2-D" (Profile measuring station RM 600 2-D) of Rodenstock, Munich. The measuring system essentially comprises three components, namely an optical distance sensor, a linear or X/Y advancing unit and a control computer with color screen or monitor, printer, and software package. The key component of the system is an optical sensor which registers changes in distance by means of a laser focus of 1 or 2 μm in diameter. In measurement, the measured object is moved uniformly past the sensor. The measured values thereby occurring form a level profile which can be output by the control computer as a graphic and which can be measured. By suitable filtering, findings on individual surface parameters, such as roughness, waviness etc. are possible.

The optical distance sensor operates with an infrared laser, the beam of which is focussed on the surface of the measured object. Depending on the type of sensor, a light spot of 1 or 2 μm in diameter is produced on the measured surface and imaged in the sensor onto a focus detector. If the distance from the measured surface changes, the detector supplies a control signal for the automatic focus correcting means. A plunger coil system then displaces the objective until the laser beam is again focussed exactly on the surface of the measured object.

Since the focus distance is constant, the movements of the objective correspond exactly to the level variation of the measured surface. The respective position of the objective is detected by an inductive sensor and supplies a measuring signal which is independent of the reflection characteristics of the measured surface. This surface measuring system is not suitable for the measurement of fast-running materials.

Apart from the surface structure of materials, their surface condition is also a quality feature which can be used for controlling the processing of such materials. The surface condition determines, inter alia, the reflectivity or the diffuse reflectance value of the surface for incident radiation in the ultraviolet or infrared range. For example, the thickness of the aluminum oxide layer on the surface of an aluminum strip or an aluminum plate is the determining parameter for the reflection of incident infrared radiation on the material surface.

This also applies in the same way to layers of different composition, such as for example layers of light-sensitive substances, with which aluminum strips or plates are coated during the production of printing plates. As the thickness of the coating of such materials on the surface increases, the surface loses reflectivity, and the reflected infrared or thermal radiation decreases.

If, for example, transparent materials are concerned, such as plastics films, as the thickness of these materials increases, their reflectivity on the surface decreases.

OBJECTS AND SUMMARY OF THE INVENTION

One object of the invention is to develop a method which, on the basis of the reflection behavior of the radiation directed onto the material surface, permits a determination of the surface condition, governed by oxide weight, or of the layer thickness of a surface layer or of the material thickness, in a simple way.

In accordance with a first aspect of the invention, the method includes the steps of maintaining the temperature of the material at a measuring point constant over a measuring area, exposing the measuring area of a surface of the material to obliquely incident infrared radiation, and measuring the temperature of radiation reflected from the measuring area of the surface of the material.

Advantageously, the step of exposing the surface comprises irradiating the measuring area with an infrared radiator. Further steps may include maintaining the temperature of radiation emitted by the infrared radiator constant, exposing different surface structures of the material to radiation from the infrared radiator and measuring the temperatures of radiation reflected from the different surface structures, and empirically determining temperature variations of the reflected radiation in dependence on the surface structures of the material. A further step may include comparing the measured temperature of the reflected radiation with a set value to obtain a signal for controlling the treatment of the surface of the material.

Another object of the invention is to provide a measuring arrangement for performing a contactless on-line measurement of one of a surface structure of a material, the thickness of the material, and the thickness of a layer disposed on the material. The surface condition preferably comprises one of a surface structure of a material, the thickness of said material, and the thickness of a layer disposed on said material.

In accordance with one aspect of the invention, this object is achieved by providing an infrared radiator which directs infrared rays onto an outlined measuring area of a surface of the material in a path which is directed obliquely onto the surface of the material, and an infrared thermometer which receives infrared rays reflected from the surface of the material.

As another aspect of the invention, a comparison device is also provided in which temperature variations of the radiation reflected from the surface of the material are determined by comparing temperature values detected by the infrared thermometer to a set value which is fed into the comparison device. The temperature variations depend on the surface condition of the material. The comparison device generates differential signals from the temperature variations to obtain control signals. The comparison device also has an output which receives the control signals and which is connected to a control device for altering the surface condition of the material.

In accordance with another aspect of the invention, a measuring arrangement is provided for performing a contactless on-line measurement of one of a surface structure of a material, the thickness of the material, and the thickness of a layer disposed on the material. The measuring arrangement includes means for directing infrared rays onto a surface of the material within an outlined measuring area in a path which is directed obliquely onto the surface, means for receiving infrared rays reflected from the surface of the material, and means, responsive to the means for receiving, for determining the surface condition of the material.

Other objects, features and advantages of the present invention will become apparent to those skilled in the art from the following detailed description. It should be understood, however, that the detailed description and specific examples, while indicating preferred embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being had to the accompanying drawings in which like reference numerals represent like parts throughout, and in which.

DETAILED DESCRIPTION OF THE PREFERRED EMBODIMENTS

Figure 1:
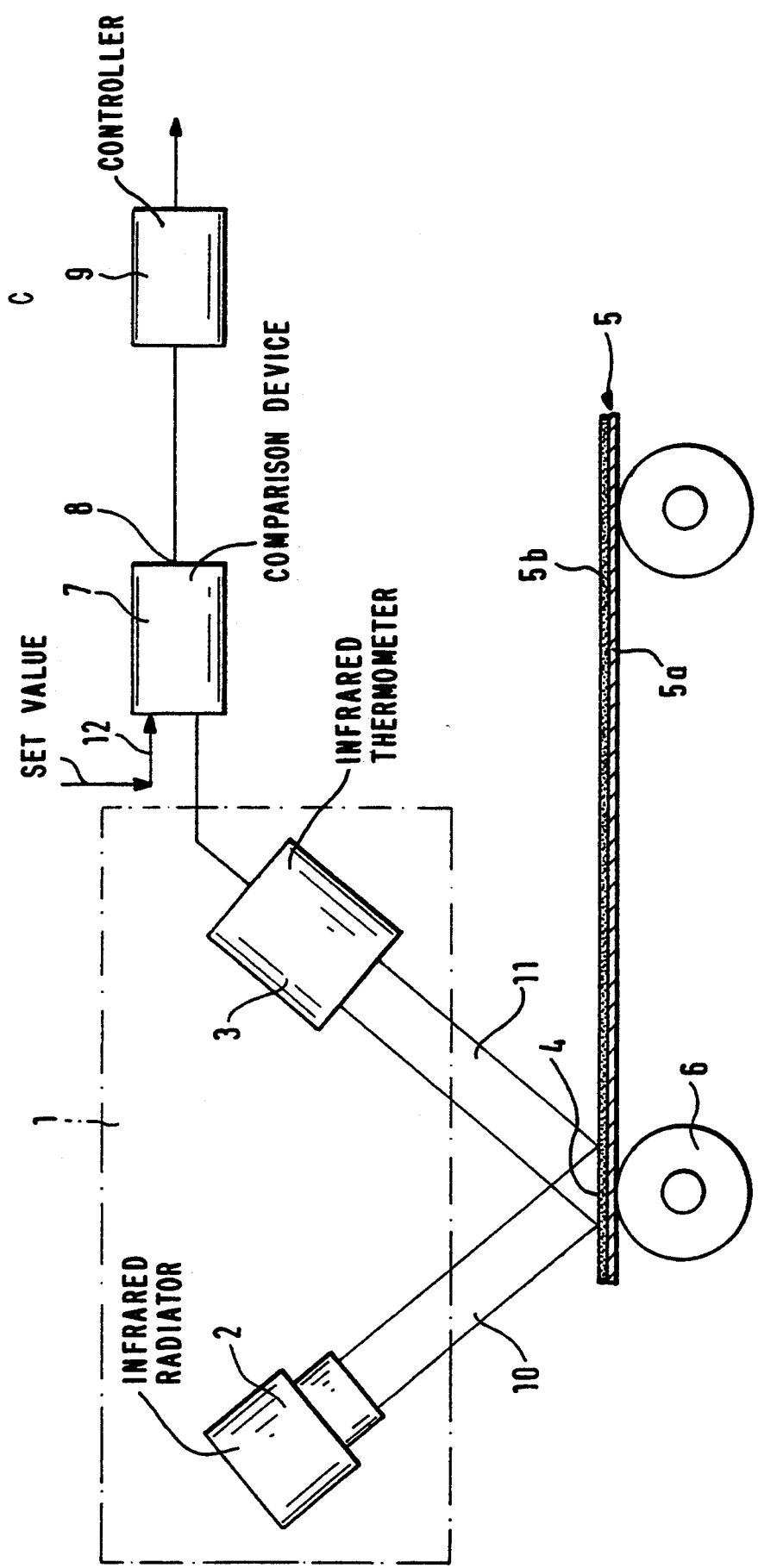
FIG. 1 diagrammatically shows a measuring arrangement according to the invention.

The principal object of the invention is achieved by maintaining a constant temperature of the material over the measuring area, by exposing the area to obliquely incident infrared radiation, and by measuring the temperature of the radiation reflected from the measuring area on the material surface.

In a refinement of the method, with constant temperature of the infrared radiator, the temperature of the radiation reflected from the surface is measured for different surface structures of the material and thus the temperature variation of the reflected radiation is determined empirically in dependence on the surface structures of the material.

In a further development of the method, the measured temperature of the reflected radiation is compared with a set value of the temperature, and from the comparison a signal is obtained for controlling the treatment of the material surface. The material is expediently irradiated at the measuring point by an infrared radiator at constant temperature, preferably in the range from 373 to 393K.

The measuring arrangement for contactless on-line measurement of the surface structure or for measuring the thickness of a material or a layer on a material in plate or strip form is distinguished by the fact that it comprises an infrared radiator and an infrared thermometer and that the path of the rays of the infrared radiator is directed obliquely onto the material surface within an outlined measuring area. The measuring arrangement is expediently fitted above a steel roll, over which the material is passed, and the steel roll itself is heated. The measuring arrangement further comprises a comparison device in which is stored the temperature variation of the radiation which is reflected from the material surface in dependence on the surface structures, such as layer thickness, oxide weight, or on the material thickness. A set value of the temperature is fed into the comparison device and compared with the respective measured temperature values in order to obtain a control signal from the differential signal, and an output of the comparison device is connected to a treatment device for the material.

A measuring arrangement 1 for the contactless on-line measurement of the surface structure or the thickness of a layer on a material 5 in plate or strip form comprises an infrared radiator 2 and an infrared thermometer 3. The path of rays 10 of the infrared radiator 2 is directed obliquely onto the material surface within an outlined measuring area 4. This measuring area 4 is located above a steel roll 6, over which the material 5 is passed. The steel roll 6 is heated and is kept at a temperature equal to or greater than 373K, a temperature range of 373 to 393K being preferred.

The infrared thermometer 3 is electrically connected to a comparison device 7, in which the temperature variation of the radiation reflected from the material surface in dependence on the surface structures, such as layer thickness, oxide weight, or on the material thickness is stored. An output 8 of this comparison device 7 is connected to a controller 9 of a treatment device for the material 5. This treatment device, which is not shown, may be, for example, an acid bath, through which the aluminum strip is passed. By automatically or manually regulating the acid concentration in the acid bath by means of the output signal of the comparison device 7, the roughening and, ultimately, the oxide weight of the oxide layer developing on the aluminum surface of the strip can be kept constant to a great extent.

The measured temperature values fed into the comparison device 7 are compared with a set value of the temperature, in the event of coincidence no output signal being obtained via the output 8. Only in the event of deviations between the set value and the instantaneous measured temperature value is an output signal obtained from the comparison device 7, which signal is then used for controlling the treatment device for the material.

If different roughenings occur on the material surface, for example an aluminum surface, whether due to a changed electric current or different concentrations of the acid bath through which the aluminum strip is passed, due to different speeds or due to differences in the material, the material surface has a changed diffuse reflectance. This change is detected by the infrared thermometer as a temperature change and used for controlling the treatment device. The prerequisite for this measuring method is that, for a particular material 5 which exhibits a different surface condition with respect to specific properties, the temperature variation as a function of the surface structures or the surface condition is, in advance, empirically determined. These properties include the oxide weight of an oxide layer 5b developing on the surface, the thickness of an applied light-sensitive layer, also 5b on the surface, or the toughening of the surface. The layer 5b rests on a substrate 5a. This temperature variation is synonymous with the diffuse reflectance of the material surface in the case of different structures or different conditions of the surface.

The surface temperature of the infrared radiator 2 is kept constant, for example at 473K, during the measurement. The obliquely incident infrared radiation or thermal radiation on the surface to be measured in the measuring area 4 is reflected within a path of rays 11, care having to be taken that the entire measuring area 4 of the surface which lies in the field of coverage of the infrared thermometer 3 is thermally irradiated in the range from 373 to 393K.

The measuring method is based on the idea that the reflected thermal radiation of the infrared radiator 2 depends on the surface structure or the surface condition of the material surface on which the radiation impinges. Thus, for example, it is found that an unoxidized surface reflects the thermal radiation more than an oxidized aluminum surface. The thicker the oxide layer on the aluminum surface, the less the impinging thermal radiation is reflected. The oxide layer thickness is thus decisive for the reflectivity or the diffuse reflectance value of the material surface. The measuring method is not restricted only to the determination of aluminum oxide layers on aluminum surfaces, but can be used in the case of all materials of which the surfaces reflect infrared radiation well in the uncovered state, i.e. consist of materials which are not black bodies, since these have, as is well-known, an absorptivity of one for all wavelengths. If such materials are covered with layers which have a greater diffuse reflectance value or reflection factor, i.e. in the event of an increase in the thickness of such layers on the surface, the reflectivity at the surface and the reflected thermal radiation decreases. As a result, the measured temperature drops. In the production of printing plates, for which light-sensitive layers are applied to aluminum strips, for example, the thickness of these light-sensitive layers after the application unit downstream of the drying zone is measured. With increasing coating thickness, the measured infrared temperature decreases.

The measuring method may also serve to determine the thicknesses of transparent film webs. For this purpose, the measuring arrangement is attached above the steel roll 6, which in film stretching installations is mirror-smooth and has a very low absorption value and over which the film web is transported during the production process.

Figure 2:
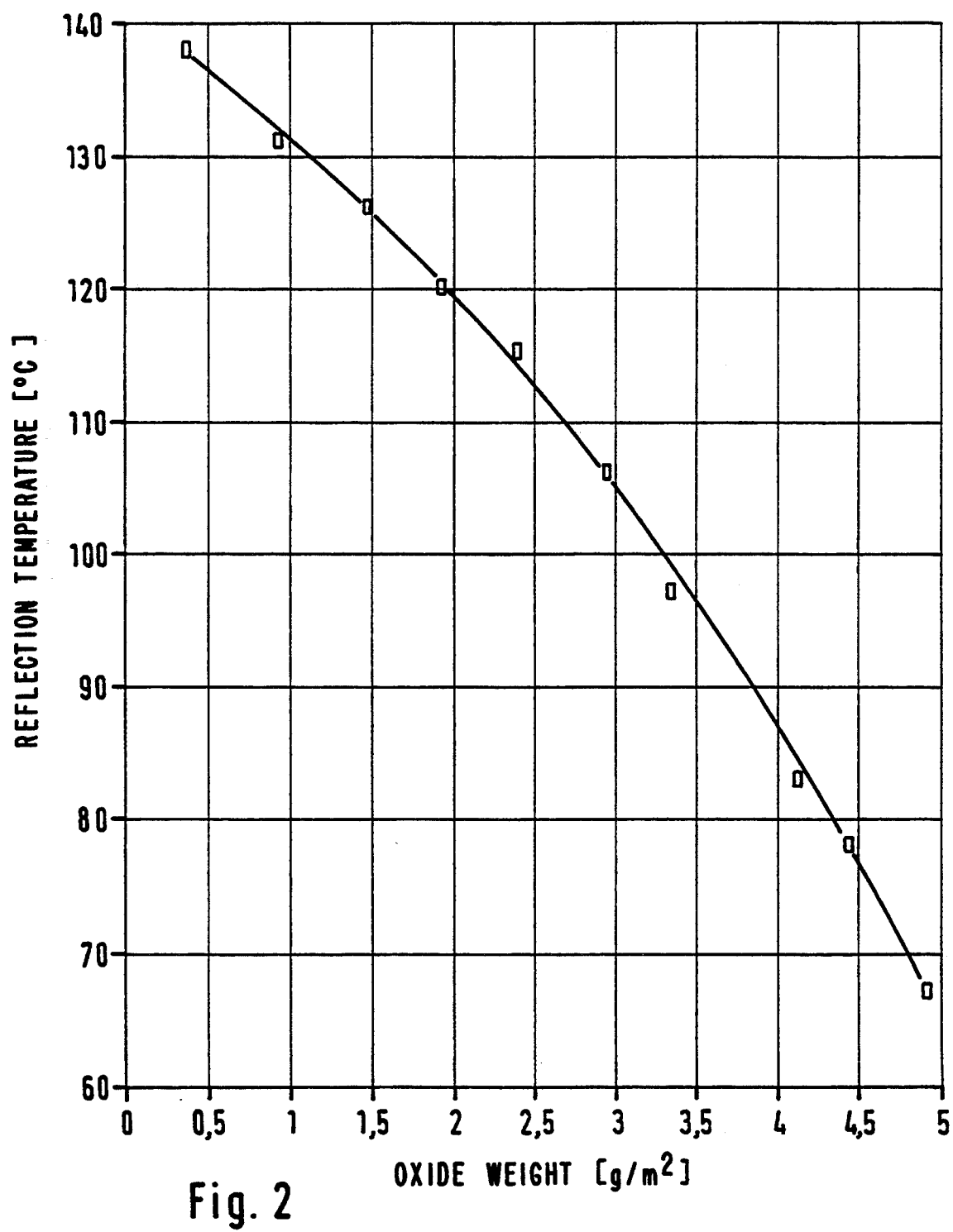
FIG. 2 shows in a diagram the relationship between the measured temperature of the IR radiation reflected from an aluminum oxide surface and the aluminum oxide weight of an aluminum oxide layer on a roughened aluminum strip.
Figure 3:
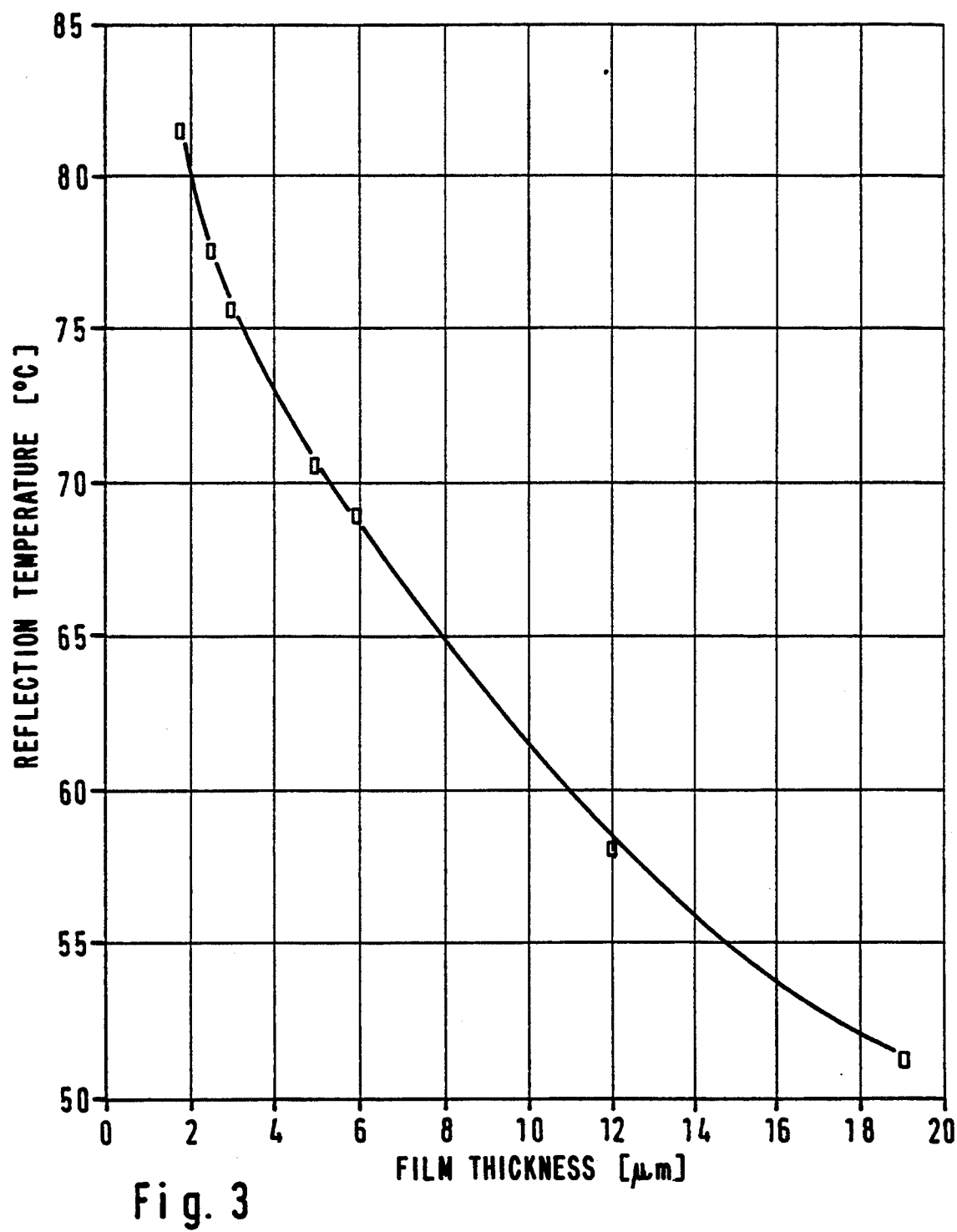
FIG. 3 shows in a diagram, similar to FIG. 2, the temperature variation of the IR radiation reflected from a transparent plastics film, in dependence on the film thickness.

FIGS. 2 and 3 show in diagrams the dependence of the measured temperature of the reflected infrared radiation, referred to for short as reflection temperature in °C., on the aluminum oxide weight per unit area in $g/m^2$ of an aluminum strip and on the film thickness in $\mu m$ of a polyester film, respectively. In the case of the diagram according to FIG. 2, the temperature of the infrared radiator 2 of the measuring arrangement is kept constant at 200° C. (473K), and the aluminum strip runs through an acid bath of hydrochloric acid, in which it is roughened.

As can be seen from the diagram, the temperature of the reflected radiation drops with increasing oxide weight. This temperature variation is stored in the comparison device 7 for an aluminum strip of a particular composition as a characteristic variable or calibrating curve. If the infrared temperature or the temperature of the reflected infrared radiation of an aluminum oxide layer on the aluminum strip is measured, the thickness of the oxide layer can be determined by a comparison with the stored temperature variation. If the value of this oxide layer thickness deviates from a desired set value, the output signal of the comparison device 7, which represents a measure of the deviation upward or downward, is used for controlling the treatment device, i.e. in the present case the acid bath. Then, according to requirements, either the acid concentration is increased or decreased or the running-through speed of the aluminum strip through the acid bath is altered. A further possibility is to alter the electric current which is applied to electrodes in the acid bath appropriately until the values for the desired oxide layer thickness are reached.

The diagram in FIG. 3 shows a similar variation to the diagram in FIG. 2 and relates to the dependence of the temperature of the infrared radiation reflected from a polyester film on the film thickness in $\mu$m. In this case, the polyester film runs over a bright steel roll. The polyester film is kept at a temperature of, for example, 373K to 393K by the infrared radiator 2. With increasing film thickness, the measured temperature of the reflected radiation drops. This temperature variation is recorded by polyester films of different thicknesses being exposed to obliquely incident infrared radiation under otherwise identical measuring conditions and the temperature of the reflected infrared radiation being recorded by means of the infrared thermometer 3. This empirically measured temperature curve then again forms a characteristic curve which makes it possible to determine the thickness of the measured polyester film on the basis of a measured temperature of the reflected radiation. If it is found here that this thickness deviates from a set value which is fed via an input 12 into the comparison device 7, a differential signal is produced at the output 8 of the comparison device 7 as a control signal for the film installation. Depending on the operating sign of this control signal, the film is then stretched to a greater or lesser extent in the longitudinal direction and transverse direction or in the longitudinal direction alone in a manner which is per se known.

With the invention, the advantage is attained that the relationship between the reflectivity of a material surface for thermal radiation and the surface condition, governed by oxide layer weight, thickness of an applied layer, or the material thickness, in the case of transparent plastics films, can be used in a simple way with little expenditure on apparatus. Both the infrared radiator used and the infrared thermometer are commercially available devices and thus are not described in greater detail.

What is claimed is:

1. A method of performing a contactless on-line measurement of one of a plurality of surface conditions of a material, said method comprising the steps of:
    (A) maintaining the temperature of said material constant over an outlined measuring area;
    (B) exposing said outlined measuring area of a surface of said material to obliquely incident infrared radiation;
    (C) measuring the temperature of radiation reflected from said measuring area of said surface of said material, said reflected radiation having an intensity which depends on a reflectivity of a surface roughness of the material and on an absorptivity of surface structures including at least one of layer thickness, oxide weight, and material thickness; and
    (D) comparing the measured temperature of the reflected radiation with a set value to determine said one of a plurality of surface conditions of said material including at least one of a surface structure of said material, a thickness of said material, a thickness of a layer disposed on said material, and a weight of a layer disposed on said material, and to obtain a signal for controlling a treatment of said surface of said material.

2. The method as claimed in claim 1, wherein said step (B) comprises irradiating said outlined measuring area with an infrared radiator, and further comprising the steps of:
    (E) maintaining the temperature of radiation emitted by said infrared radiator constant;
    (F) exposing different surface structures of said material to radiation from said infrared radiator and measuring the temperatures of radiation reflected from said different surface structures; and
    empirically determining temperature variations of the reflected radiation in dependence on said surface structures of said material.

3. The method as claimed in claim 1, wherein said step (B) comprises irradiating said measuring area of said material at a constant temperature.

4. The method as claimed in claim 1, wherein said step (B) comprises irradiating said outlined measuring area of said material at a constant temperature of between 373 and 393 K.

5. The method as claimed in claim 1, further comprising the step of measuring, based on the temperature measured in said step (C), a thickness of a layer which is disposed on said material, said surface of said material having a high reflectivity for infrared radiation when said surface is uncoated.

6. The method as claimed in claim 5, wherein said material is composed of aluminum, and said layer comprises an aluminum oxide layer, and wherein said step of measuring said thickness of said layer comprises the step of measuring the thickness of said aluminum oxide layer, thereby determining the surface condition of said aluminum.

7. The method as claimed in claim 5, wherein said material is composed of aluminum and said layer comprises a light-sensitive layer, and wherein said step of measuring said thickness of said layer comprises the step of measuring the thickness of said light-sensitive layer.

8. The method as claimed in claim 1 wherein said material is composed of a plastics film and wherein said step of measuring said thickness of said material comprises the step of measuring the thickness of said plastics film.

9. The method as claimed in claim 1, wherein said step (B) comprises exposing all of said outlined measuring area of said material to obliquely incident infrared radiation, all of said exposed measuring area is lying in a field of coverage of a measuring device for measuring radiation reflected from said surface of said material.

10. The method as claimed in claim 1, wherein the measuring step includes measuring the temperature of reflected radiation having an intensity which depends on the oxide weight of the layer disposed on said material.

11. The method as claimed in claim 10, wherein the comparing step includes determining the weight of the layer disposed on said material.

12. A measuring arrangement for performing a contactless on-line measurement of one of a plurality of surface conditions including a surface structure of a material, the thickness of said material, and the thickness or the weight of a layer disposed on said material, said measuring arrangement comprising:

(A) an infrared radiator which directs infrared rays onto an outlined measuring area of a surface of said material in a path which is directed obliquely onto said surface of said material;

(B) an infrared thermometer which receives infrared rays reflected from said surface of said material, said reflected infrared rays having an intensity which depends on a reflectivity of a surface roughness of the material and on an absorptivity of the surface structure including one of layer thickness, oxide weight, and material thickness; and (C) a comparison device, which is electrically connected to said infrared thermometer, in which comparison device are stored measured temperature values of the radiation reflected from said surface of said material and in which comparison device the measured temperature values are compared to a set value which is fed into said comparison device after the measured temperature values are determined, said comparison device generating differential signals from said measured temperature values and said set value to obtain control signals, said differential signals being indicative of said one of a plurality of surface conditions including said one of layer thickness, oxide weight, and material thickness, said comparison device being connected to a control device which receives said control signals for altering one of said surface conditions of said material.

13. The measuring arrangement as claimed in claim 12, further comprising a steel roll which rotatably supports said material, which is disposed under said infrared radiator and said infrared thermometer, and which is heated.

14. The measuring arrangement as claimed in claim 12, wherein said thermometer receives reflected infrared rays having an intensity which depends on the oxide weight of the layer disposed on said material.

15. The measuring arrangement as claimed in claim 14, wherein said differential signals are indicative of the oxide weight of the layer disposed on said material.

16. The measuring arrangement as claimed in claim 12, wherein said infrared radiator directs infrared rays at a constant temperature onto said surface of said material within said outlined measuring area.

17. The measuring arrangement as claimed in claim 12, wherein said infrared radiator directs infrared rays at a constant temperature of between 373K and 393K onto said surface of said material within said outlined measuring area.

18. A measuring arrangement for performing a contactless on-line measurement of one of a plurality of surface conditions of a material, said arrangement comprising:

(A) means for directing infrared rays onto a surface of said material within an outlined measuring area in a path which is directed obliquely onto said surface;

(B) means for receiving and measuring infrared rays reflected from said surface of said material, said reflected infrared rays having an intensity which depends on a reflectivity from the surface of said material and an absorptivity of surface structures including one of layer thickness, oxide weight, and material thickness; and (C) means, responsive to an output value of said means (B), for determining said one of a plurality of surface conditions of said material, including the surface structure of said material, the thickness of said material, the thickness of a layer disposed on said material, and the weight of a layer disposed on said material;

wherein said means (C) comprises means for comparing said reflected infrared rays determined by said means (B) to a set value and for generating differential signals from the reflected infrared rays and said set value, said differential signals being transmitted to a control device for altering one of said surface conditions of said material;

wherein said receiving and measuring means receives and measures reflected infrared rays having an intensity which depends on the oxide weight of the layer disposed on said material.

19. The measuring arrangement as claimed in claim 18, wherein said determining means determines the weight of the layer disposed on said material.

* * * * *